(12) United States Patent
Guinart et al.

(10) Patent No.: US 11,260,706 B2
(45) Date of Patent: Mar. 1, 2022

(54) METHOD FOR PAIRING A MEASUREMENT MODULE MOUNTED IN A MOTOR VEHICLE WHEEL, AT THE INITIATIVE OF A COMPUTER

(71) Applicants: Continental Automotive France, Toulouse (FR); Continental Automotive GmbH, Hannover (DE)

(72) Inventors: Nicolas Guinart, Toulouse (FR); Jean-Philippe Boisset, Toulouse (FR); Sébastien Plancke, Toulouse (FR)

(73) Assignees: Continental Automotive France; Continental Automotive GmbH

( * ) Notice: Subject to any disclaimer, the term of this patent is extended or adjusted under 35 U.S.C. 154(b) by 6 days.

(21) Appl. No.: 16/963,378

(22) PCT Filed: Feb. 8, 2019

(86) PCT No.: PCT/FR2019/050282
§ 371 (c)(1),
(2) Date: Jul. 20, 2020

(87) PCT Pub. No.: WO2019/166713
PCT Pub. Date: Sep. 6, 2019

(65) Prior Publication Data
US 2021/0362554 A1 Nov. 25, 2021

(30) Foreign Application Priority Data
Feb. 27, 2018 (FR) ...................................... 1851670

(51) Int. Cl.
B60C 23/04 (2006.01)
(52) U.S. Cl.
CPC ...... B60C 23/0489 (2013.01); B60C 23/0415 (2013.01); B60C 23/0425 (2013.01); B60C 23/0488 (2013.01)
(58) Field of Classification Search
CPC ............ B60C 23/0408; B60C 23/0496; B60C 23/0494; B60C 23/061; B60C 23/0416; B60C 23/0433; B60C 23/0493; B60C 19/00; B60C 23/04; B60C 23/0479; B60C 23/0411; B60C 23/041; B60C 23/0462;
(Continued)

(56) References Cited

U.S. PATENT DOCUMENTS

| 7,230,525 B2 | 6/2007 | Hirai |
| 2004/0021562 A1 | 2/2004 | Prenninger |

(Continued)

FOREIGN PATENT DOCUMENTS

| EP | 1800913 A1 | 6/2007 |
| FR | 2839923 A1 | 11/2003 |

OTHER PUBLICATIONS

International Search Report and Written Opinion for International Application No. PCT/FR2019/050282, dated May 23, 2019, 9 pages.

(Continued)

*Primary Examiner* — Andre J Allen
(74) *Attorney, Agent, or Firm* — RatnerPrestia

(57) ABSTRACT

A method for pairing a measurement module with a wheel of a vehicle including, for each angular orientation signal associated with a specific wheel received by a computer, the steps of transmitting, by the computer, a measurement signal or a request to transmit a measurement signal to each module, measuring, by the computer or each module, a value of at least one parameter differentiating the signal, performing repetitions of the transmissions of measurement signals for each angular orientation signal received by the computer and storing values of the parameter, pairing a specific wheel with a measurement module when the values are substantially constant with a variation of less than 10% for the values, each wheel being associated with a module at the end of the method.

12 Claims, 2 Drawing Sheets

(58) Field of Classification Search
CPC .... B60C 11/24; B60C 23/0444; B60C 23/20; B60C 23/064; B60C 23/0401; B60C 23/0488; B60C 23/062; B60C 23/0413; B60C 23/007; B60C 23/0452; B60C 11/246; B60C 23/06; B60C 23/0442; B60C 23/043; B60C 99/006; B60C 23/0498; B60C 23/00354; B60C 23/02; B60C 23/0467; B60C 2019/004; B60C 23/0428; B60C 23/00372; B60C 23/009; B60C 23/0425; B60C 23/00318; B60C 11/243; B60C 23/004; B60C 23/045; B60C 23/0464; B60C 23/00363; 23/0472; B60C 23/066; B60C 29/02; B60C 11/00; B60C 23/0403; B60C 23/006; B60C 23/0406; B60C 23/044; B60C 23/0454; B60C 23/00; B60C 23/008; B60C 23/0455; B60C 23/0461; B60C 23/0483; B60C 25/002; B60C 23/0415; B60C 23/0474; B60C 23/0489; B60C 29/064; B60C 2200/02; B60C 23/0481; B60C 23/0491; B60C 23/0459; B60C 23/0471; B60C 23/0477; B60C 11/0318; B60C 2019/005; B60C 23/0405; B60C 23/042; B60C 23/002; B60C 23/00336; B60C 23/0422; B60C 25/132; B60C 13/001; B60C 23/0437; B60C 23/0466; B60C 23/0476; B60C 29/06; B60C 9/18; B60C 23/00345; B60C 23/0423; B60C 23/0449; B60C 23/0447; B60C 23/04985; B60C 25/00; B60C 13/00; B60C 17/00; B60C 19/003; B60C 2019/006; B60C 23/0427; B60C 23/0486; B60C 23/065; B60C 17/02; B60C 23/001; B60C 23/0445; B60C 23/0484; B60C 23/08; B60C 5/004; B60C 9/02; B60C 23/0457; B60C 25/142; B60C 25/145; B60C 11/0083; B60C 11/13; B60C 23/0418; B60C 23/0469; B60C 23/127; B60C 25/18; B60C 11/0332; B60C 23/0432; B60C 23/068; B60C 23/126; B60C 25/005; B60C 25/138; B60C 29/00; B60C 5/14; B60C 99/003; B60C 11/03; B60C 11/12; B60C 17/04; B60C 17/06; B60C 23/005; B60C 23/063; B60C 23/135; B60C 23/137; B60C 25/007; B60C 25/0554; B60C 25/14; B60C 29/062; B60C 29/066; B60C 3/00; B60C 11/0302; B60C 11/032; B60C 11/11; B60C 13/003; B60C 13/02; B60C 19/001; B60C 2011/1213; B60C 2011/1245; B60C 23/10; B60C 23/131; B60C 23/16; B60C 25/056; B60C 29/005; B60C 29/04; B60C 29/068; B60C 3/04; B60C 5/142; B60C 9/20; B60C 99/00; B60C 11/01; B60C 11/02; B60C 11/0306; B60C 15/06; B60C 17/0009; B60C 19/002; B60C 19/08; B60C 19/12; B60C 2009/2038; B60C 2011/0374; B60C 2011/0388; B60C 2200/065; B60C 23/00305; B60C 23/00347; B60C 23/0435; B60C 23/067; B60C 23/121; B60C 23/123; B60C 23/133; B60C 23/18; B60C 25/02; B60C 25/05; B60C 5/22; B60C 7/12; B60C 1/0008; B60C 1/0016; B60C 11/0058; B60C 11/0311; B60C 11/033; B60C 11/1218; B60C 11/124; B60C 11/1384; B60C 13/04; B60C 15/0036; B60C 15/024; B60C 17/041; B60C 17/066; B60C 2007/005; B60C 2009/0071; B60C 2009/2022; B60C 2011/0033; B60C 2011/0358; B60C 2011/1254; B60C 2017/068; B60C 2019/007; B60C 2200/06; B60C 2200/12; B60C 2200/14; B60C 25/0503; B60C 25/0515; B60C 25/0521; B60C 25/0548; B60C 25/0551; B60C 25/15; B60C 25/16; B60C 29/007; B60C 3/06; B60C 5/001; B60C 5/002; B60C 5/02; B60C 5/20; B60C 7/00; B60C 7/105; B60C 7/107; B60C 9/005; B60C 9/1807; B60C 9/28; B60C 2011/1231; B60C 11/0304; G01M 17/02; G01M 17/022; G01M 17/027; G01M 17/021; G01M 17/024; G01M 17/025; G01M 17/013; G01M 17/007; G01M 1/045; G01M 1/02; G01M 1/326; G01M 17/06; G01M 1/30; G01M 1/225; G01M 17/0074; G01M 5/0058; G01M 1/26; G01M 17/04; G01M 17/0072; G01M 17/065; G01M 17/10; G01M 1/16; G01M 7/00; G01M 99/00; G01M 3/40; G01M 7/08; G01M 1/34; G01M 1/04; G01M 17/028; G01M 17/045; G01M 17/08; G01M 3/3218; G01M 1/365; G01M 13/04; G01M 17/03; G01M 5/0066; G01M 5/0091; G01M 1/00; G01M 1/08; G01M 1/22; G01M 13/027; G01M 15/044; G01M 5/0033; G01M 5/0075; G01M 1/06; G01M 1/12; G01M 1/122; G01M 1/24; G01M 1/32; G01M 1/36; G01M 11/081; G01M 13/023; G01M 13/025; G01M 17/00; G01M 17/0076; G01M 3/022; G01M 3/04; G01M 3/042; G01M 3/045; G01M 3/147; G01M 3/227; G01M 3/24; G01M 3/2876; G01M 3/3236; G01M 5/0016; G01M 5/0025; G01M 5/0083; G01M 7/02; G01M 7/022; G01M 7/025; G01M 7/04; G01M 7/06; G01M 9/02; G01M 9/04; G01M 99/002; G01M 99/004
USPC .................................................. 73/146–146.8
See application file for complete search history.

(56) References Cited

U.S. PATENT DOCUMENTS

| 2010/0274607 | A1* | 10/2010 | Carresjo | G01M 17/013 |
| --- | --- | --- | --- | --- |
| | | | | 705/7.11 |
| 2011/0071737 | A1 | 3/2011 | Greer et al. | |
| 2014/0132740 | A1* | 5/2014 | Clark | G01B 11/245 |
| | | | | 348/48 |
| 2020/0086698 | A1* | 3/2020 | Guinart | B60C 23/061 |

OTHER PUBLICATIONS

International Search Report and Written Opinion for International Application No. PCT/FR2019/050282, dated May 23, 2019, 13 pages (French).

* cited by examiner

METHOD FOR PAIRING A MEASUREMENT MODULE MOUNTED IN A MOTOR VEHICLE WHEEL, AT THE INITIATIVE OF A COMPUTER

CROSS REFERENCE TO RELATED APPLICATIONS

This application is the U.S. National Phase Application of PCT International Application No. PCT/FR2019/050282, filed Feb. 8, 2019, which claims priority to French Patent Application No. 1851670, filed Feb. 27, 2018, the contents of such applications being incorporated by reference herein.

FIELD OF THE INVENTION

The present invention pertains to the field of motor vehicles and relates more particularly to a method and to a set of a computer and measurement modules for pairing each measurement module with the wheel in which it is installed, which is done at the initiative of the computer. The invention aims in particular to propose a fast, reliable and effective method allowing an on-board computer in a motor vehicle to associate a measurement module with the wheel in which it is installed.

BACKGROUND OF THE INVENTION

Nowadays, it is known practice to install, in each wheel of a motor vehicle, a measurement module for monitoring certain parameters of said wheel. Such a measurement module is commonly called a TPMS, for "tire pressure monitoring system", module. Such a measurement module, the data from which are transmitted to an on-board computer in the vehicle, makes it possible for example to measure the pressure of the tire as well as its temperature.

As a motor vehicle comprises a plurality of wheels, it is necessary for the computer to identify the measurement module of each wheel in order to allow it to determine the wheel to which the data correspond and thus be able to utilize said data. It is therefore necessary for each measurement module to locate the wheel in which it is installed. Such a location and association method is known to those skilled in the art under the name pairing.

In one existing solution, known under the name "localization with synchronized emissions" (LSE), it is known practice to use a measurement module comprising an acceleration measurement sensor for each wheel, this measurement module commonly being called the wheel unit.

When the wheels turn, the measurements performed by the acceleration measurement sensor allow the measurement module to determine the time at which it is in a predetermined position, for example at its maximum height, for which it then sends the computer a coded message in one or more signals.

In order to associate each measurement module with a wheel of the vehicle, it is necessary to associate the signals received from each measurement module with a parameter specific to each wheel. Now, when the vehicle is moving, it is observed that each wheel turns at a rotational speed different from the other wheels, in particular due to the fact that some of the wheels may have different diameters and that they follow different trajectories on bends.

In this existing solution, the computer uses the wheel anti-lock braking system of the vehicle, also known under the name ABS system, to determine the angular orientation of each wheel.

The ABS system comprises a plurality of wheel anti-lock braking modules each installed facing each wheel of the vehicle. Each wheel anti-lock braking module includes a sensor, called WSS ("wheel speed sensor"), delivering a signal representative of the angular orientation of the corresponding wheel to the computer, the computer advantageously forming part of an electronic control unit responsible for controlling and monitoring the measurement modules or wheel units.

For each measurement module, the computer thus correlates, upon each wheel revolution, the time of reception of the signal transmitted by the measurement module with the value of the wheel angular orientation signal received from each anti-lock braking module.

In doing so, the computer determines that a measurement module is associated with a wheel when the angular orientation of said wheel is substantially the same each time a signal is transmitted by this measurement module (that is to say each time the measurement module is situated in the same angular position). Specifically, with the wheels turning at different speeds, in particular on bends, the result of this is that the signals transmitted by a measurement module installed in a given wheel are not synchronized with the angular orientations of the other wheels.

By proceeding in this way, the computer is then able to associate each measurement module with one of the wheels of the vehicle. However, such a solution exhibits the drawback of requiring each wheel to use a measurement module including an acceleration sensor, thereby making the measurement module complex and expensive.

To at least partly overcome this drawback, document U.S. Pat. No. 7,230,525, incorporated herein by reference, discloses a vehicle, the measurement modules of which do not have an acceleration sensor. In this solution, the pairing of the measurement modules with their respective wheels by the computer is based on the correlation, by the computer, between the power of the signals received from the measurement modules and the angular orientation of each wheel, the signals being transmitted periodically, for example every 15 or 20 seconds.

Specifically, during the rotation of a wheel, depending on the angular position of the measurement module, the power of a signal received by the computer will be higher or lower. The closer the measurement module is to the computer and if there is no obstacle between them, the higher this power will thus be. By contrast, if the measurement module is far from the computer or an obstacle is situated between the two of them, the power of the received signal will be lower.

This method requires each measurement module to transmit a minimum number of signals allowing the computer to determine a set of points representative of the variations in power of the received signals as a function of the angular orientation of each wheel.

The correlation is established when the set of points representative of the variations in power of the received signals as a function of the angular orientation of each wheel produces, for a given wheel, a repetitive pattern characterizing the synchronization of the angular orientation of said wheel with the power of the signals from the corresponding measurement module.

To establish such a correlation, the method described in document U.S. Pat. No. 7,230,525 proposes periodically measuring the power of the signals until a minimum number of points in the interval of angular orientation of the wheel of between 0° and 360° is obtained, and then establishing a correlation when the standard deviation of the measured power values is lower than a predetermined threshold.

In practice, this method requires receiving a very high number of signals received from each measurement module, typically more than 25, thereby making the method particularly time-consuming. In addition, such a statistical solution of calculating standard deviations requires implementing a complex algorithm that requires significant processing capabilities, thereby making it extremely lengthy and expensive.

In this method described by this closest prior art represented by U.S. Pat. No. 7,230,525, it is the measurement module which takes the initiative to trigger and send measurement signals to the computer following a random transmission from each measurement module, the computer being responsible for processing the information in response. To do this, the computer must monitor the measurement signals by keeping a sufficient history.

This a posteriori processing therefore requires additional memory resources and complex processing software.

SUMMARY OF THE INVENTION

The problem underlying the present invention is that of pairing each measurement module with a wheel of a motor vehicle in which it is installed in a simple, reliable, efficient and inexpensive manner, none of the measurement modules comprising an accelerometer allowing identification by a central computer operating in transmission and in reception of signals with each measurement module of the wheel of the motor vehicle on which the module is installed.

To this end, an aspect of the present invention relates to a method for pairing a measurement module with a wheel of a motor vehicle comprising a plurality of wheels, said method being implemented by a computer on board said vehicle, said measurement module being installed in one of the wheels of the vehicle and being capable of transmitting and receiving, respectively, to or from the computer, at least one measurement signal received or transmitted by the computer in the form of a frame of which at least one differentiation parameter varies according to the position of the measurement module relative to the computer, the computer also receiving, periodically, orientation signals representative of an angular orientation of each of the wheels, noteworthy in that the pairing method comprises, for each angular orientation signal associated with a specific wheel received by the computer, the steps:

- of transmission, by the computer, of a measurement signal to each measurement module or of a request for transmission of a measurement signal sent to each measurement module for transmission of a measurement signal by each measurement module back to the computer;
- of measuring, by one from between the computer and each measurement module, a value of said at least one differentiation parameter of the measurement signal transmitted to each measurement module or the computer;
- of performing repetitions, up to a predetermined number, of the transmissions of measurement signals to each measurement module or the computer for each angular orientation signal received by the computer and storage of said values of said at least one differentiation parameter for each of the repetitions;
- of pairing the specific wheel with a measurement module when said stored values for this measurement module and for the angular orientation signals associated with the specific wheel are substantially constant with a variation of less than 10% for a majority of said values for a total number of repetitions having reached the predetermined number;
- of continuing to carry out the pairing step for all of the wheels and all of the measurement modules, each wheel being associated with a respective measurement module at the end of the method.

An aspect of the present invention allows the computer advantageously forming part of an electronic control unit for the measurement modules or wheel units to retain the initiative in the sense that the measurement of the differentiation parameter is not performed by the computer following a random transmission from each measurement module but, conversely, at the request of the computer, either by the computer itself sending measurement signals to each measurement module or by the computer sending, to each measurement module, a request to send measurement signals with a predetermined transmission order to be observed.

An aspect of the present invention thus covers the case for which the computer sends a measurement signal to each measurement module and the case for which the computer sends, to each wheel unit, a request for a measurement signal to be sent by each measurement module. The processing of this signal may thus be done either in the computer or in each measurement module.

For example, for measurement signals sent by the computer to a measurement module according to the instantaneous orientation of one of the wheels of the vehicle, with a process repeated for each of the wheels, it is the measurement module which measures the differentiation parameter for these signals and, in a first case, returns this measurement to the computer with an identification of the measurement module, the computer being responsible for storing the differentiation parameters sent by each identified measurement module for the same group of orientation signals representative of an angular orientation of a wheel and for pairing a measurement module with a wheel.

Still for measurement signals sent by the computer to a measurement module, in a second case, it is the measurement module which measures the one or more differentiation parameters for these signals and which stores these differentiation parameters until it is able to gather enough differentiation parameters for the same group of orientation signals representative of an angular orientation of a wheel in order to conclude that the measurement module has been paired with a wheel and to send a report frame to the computer stating as much.

In the case of measurement signals sent by each measurement module to the computer, in contrast to the measurement signals sent randomly by each measurement module to the computer as recommended by the prior art, it is the computer which initiates this sending of measurement signals by transmitting, to each measurement module, a request synchronized to an angular orientation signal by defining a scheduled transmission order instead of random sending of signals by each measurement module to the computer as recommended by the closest prior art. This represents a saving in terms of means and improved efficiency of exchanges between the computer and each measurement module. Each measurement module therefore follows a sequence and protocol for transmission to the computer that are defined in advance and no longer random.

The computer, advantageously forming part of the electronic control unit of the measurement modules centralizing the measurements from these modules and incorporated in the motor vehicle, retains the initiative for the pairing method. Such a method according to an aspect of the invention may be performed more efficiently in terms of energy consumption and there is no need to provide a transmission quota for each measurement module, only counting a predetermined number of repetitions of measurements making it possible to check whether the measured values of the one or more differentiation parameters remain substantially constant, which then indicates that the measurement module may be paired with the wheel associated with the angular orientation signals specific to this wheel, such an association being known to the computer, this association information being able to come from a wheel anti-lock braking system.

Advantageously, the computer transmits a measurement signal to each measurement module or a request for transmission of a measurement signal sent to each measurement module for each angular orientation signal associated with a specific wheel for as long as a measurement module has not been paired with this specific wheel, and when a measurement module has been paired with the specific wheel, the computer transmits a measurement signal or a transmission request for each angular orientation signal associated with another wheel to the measurement modules that have not yet been paired and so on until all of the measurement modules have been paired with a wheel or the computer transmits a measurement signal to each measurement module or a request for transmission of a measurement signal sent to each measurement module for all of the angular orientation signals associated, respectively, with each of the wheels stating information on the chosen angular orientation in the transmission or the transmission request in progress, each measurement module being paired with a wheel associated with a group of orientation signals with one or more defined angular orientations of the same specific wheel for which the measured values of said at least one differentiation parameter remain substantially constant.

The method according to an aspect of the present invention may consist in pairing the measurement modules with a specific wheel, wheel by wheel, by sending only angular orientation signals relating to a specific wheel for as long as this wheel has not yet been paired and so on.

Conversely, it is possible to send measurement signals or transmission requests for various angular orientation signals for different angular orientations associated with different wheels. This may greatly speed up the pairing but requires a greater energy expenditure and a more sustained rate of sending measurement signals and transmission requests. Above all, it is necessary to identify the angular orientation signals associated with a single wheel from the other angular orientation signals, which means that the measurement signals or the transmission requests must contain more information.

Advantageously, said at least one differentiation parameter may be selected from the following values taken individually or in combination: a signal power value, a gravity value imposed on the measurement module or a value of a current passing through a coil in the measurement module that is sensitive to the Earth's magnetic field.

The signal power value is preferred but may be replaced with measurements of another value if necessary. In addition, it is possible to track several differentiation parameters simultaneously for reliability control and confirmation of the measurements.

Advantageously, when the computer transmits a request for transmission of a measurement signal sent to each measurement module for transmission of a measurement signal by each measurement module back to the computer, this transmission request includes a scheduled transmission order with a transmission date and/or a delay between two consecutive transmissions of measurement signals sent back by each measurement module.

This relates to the first embodiment of the invention for which it is each measurement module which sends the signals comprising the one or more differentiation parameters.

Thus, each measurement module no longer sends measurement signals randomly to the computer but in accordance with a protocol predetermined in advance by the computer, which increases the efficiency of the sending and measurement procedure for the one or more differentiation parameters.

Advantageously, the computer, receiving the measurement signals sent back to it by each measurement module, carries out itself the storage of the values of said at least one differentiation parameter for each measurement module and the pairing of each measurement module with a given wheel when the values stored for this measurement module are substantially constant for the transmissions of the angular orientation signal associated with the given wheel. This relates to the rest of the method according to the first embodiment of the invention.

Advantageously, when each measurement module receives the measurement signals sent to it by the computer, each measurement module performs a measurement of the values of said at least one differentiation parameter during each transmission from the computer and sends the values of said at least one differentiation parameter with an identification of the measurement module to the computer.

This represents a first variant of the second embodiment of the invention, the computer sending the measurement signals to each measurement module and each measurement module measuring the value of the one or more differentiation parameters for each measurement signal.

In this first variant of the second embodiment, each measurement module sends the measurement values to the computer which is then responsible for pairing each measurement module with a wheel.

Advantageously, when each measurement module receives the measurement signals sent to it by the computer, each measurement module performs a measurement of the values of said at least one differentiation parameter during each transmission from the computer, stores said values of said at least one differentiation parameter and checks whether these values remain substantially constant for signals synchronized with one or more defined angular orientations of the same wheel, in which case the measurement module sends, to the computer, a pairing report frame for the measurement module with said orientation signals, the pairing report frame containing an associated identification of the measurement module.

The computer attaches wheel position information to the measurement signal that it transmits, which information it has taken as a reference for detecting the predetermined angular orientation. The measurement module receives and performs the measurement of the differentiation parameter in the knowledge of the group of angular orientation signals with which a potential quasi-invariability of the one or more differentiation parameters is associated.

This represents a second variant of the second embodiment of the invention for which it is each measurement module which can process the signal and conclude that it has been paired with a wheel of the vehicle, which information it then transmits to the computer, which then has a passive role in determining the pairing.

Advantageously, a communication between the computer and each measurement module takes place in accordance with a communication standard allowing very short range bidirectional data exchange using UHF radio waves in transmission and/or in reception.

A very short range data exchange using UHF radio waves allows a bidirectional data exchange using the same type of waves at reception as at transmission, and not radiofrequency waves in one direction and low-frequency waves in the other direction, which requires the computer and each measurement module to have specific transmission and reception devices for the computer and for each measurement module.

Using such a standard, for example of Bluetooth® type, also allows potential interaction with mobile telephones and architectures for future motor vehicles, which will centralize Bluetooth®-type communication for a plurality of vehicle systems, in particular for tire pressure monitoring systems, hands-free opening or starting systems and for various connection options in vehicles.

Although it is expanding for various communications used in a vehicle, such a standard had never been used for the connection between measurement modules similar to wheel units, on the one hand, and a remote monitoring and/or control device provided with a computer, on the other hand, due to increased energy expenditure.

What hampered the development of a Bluetooth®-type protocol in the motor vehicle sector for measurement modules and a computer was its energy expenditure, given the need to transmit signaling frames or beacons in order to allow possible connection, and to do so essentially in parking mode, which ultimately made the Bluetooth®-type protocol a greater consumer than a conventional radiofrequency system. This is not the case in driving mode as proposed by an aspect of the present invention in a preferred embodiment.

Advantageously, the orientation signals representative of the angular orientation of each of the wheels come from a plurality of wheel anti-lock braking modules, each wheel anti-lock braking module, installed facing a wheel, being capable of delivering, to the computer, the orientation signals representative of the angular orientation of the associated wheel.

Most wheeled motor vehicles have a wheel anti-lock braking system. The method of an aspect of the present invention uses this anti-lock braking system already present in the vehicle by making use of the continuous orientation signals that each anti-lock braking module delivers, for each wheel, to the computer, in order to pair the wheels and the measurement modules.

Such an orientation signal indicates the angular orientation of the wheel facing which the anti-lock braking module is installed. Specifically, when the vehicle is moving, each wheel turns at a speed different from the other wheels. Each anti-lock braking module thus makes it possible to know, at any time, the angular orientation of each wheel and can therefore be used as a signal representative of a wheel for the computer.

The computer or each measurement module can therefore, at a given time, simultaneously measure or receive the values of the one or more differentiation parameters of the measurement signals transmitted for or by each measurement module and the angular orientation of each wheel facing each anti-lock braking module, in order to pair a measurement module with a wheel.

An aspect of the invention relates to a set of a computer and measurement modules associated, respectively, with a wheel of a motor vehicle for the implementation of such a method, each measurement module having means for transmitting and receiving signals received or transmitted by the computer, the computer having, on the one hand, means for transmitting and receiving signals received or transmitted by each measurement module and, on the other hand, means for receiving orientation signals representative of the angular orientation of each of the wheels, each measurement module comprising means for storing a respective identifier and means for transmitting its respective identifier to the computer, noteworthy in that the computer or each measurement module comprises means for measuring a value of said at least one differentiation parameter of a measurement signal transmitted by the transmission means of each measurement module to the computer or by the transmission means of the computer to each measurement module in association with an orientation signal representative of the angular orientation of each of the wheels, means for storing a predetermined number of repetitions of the measurement signals and the values of said at least one differentiation parameter for each of the repetitions, the computer or each measurement module comprising means for determining a pairing of a wheel with a specific measurement module for which the measurement signals transmitted or received by this measurement module for orientation signals specific to a wheel have values of said at least one differentiation parameter that are substantially constant with a variation of less than 10% for a majority of said values for a total number of repetitions having reached the predetermined number.

The set according to an aspect of the invention allows the on-board computer in the vehicle to easily and quickly pair each measurement module with each of the wheels of the vehicle. The set according to an aspect of the invention may include measurement modules devoid of acceleration sensors, which are less expensive than measurement modules including such a sensor, which decreases the price of a measurement module and makes it more competitive.

An aspect of the invention also relates to a motor vehicle comprising a computer, a plurality of wheels, each wheel comprising a measurement module, and a plurality of wheel anti-lock braking modules with each anti-lock braking module installed facing a wheel comprising means for transmitting, to the computer, orientation signals representative of the angular orientation of said wheel, noteworthy in that the computer and the measurement modules form such a set, the means for receiving orientation signals representative of the angular orientation of each of the wheels of the computer receiving the orientation signals representative of the angular orientation of said wheel transmitted by each anti-lock braking module installed facing a wheel.

BRIEF DESCRIPTION OF THE DRAWINGS

Other features, aims and advantages of aspects of the present invention will become apparent on reading the detailed description that follows and on examining the appended drawings provided by way of non-limiting examples, in which.

DETAILED DESCRIPTION OF THE PREFERRED EMBODIMENTS

Figure 1:
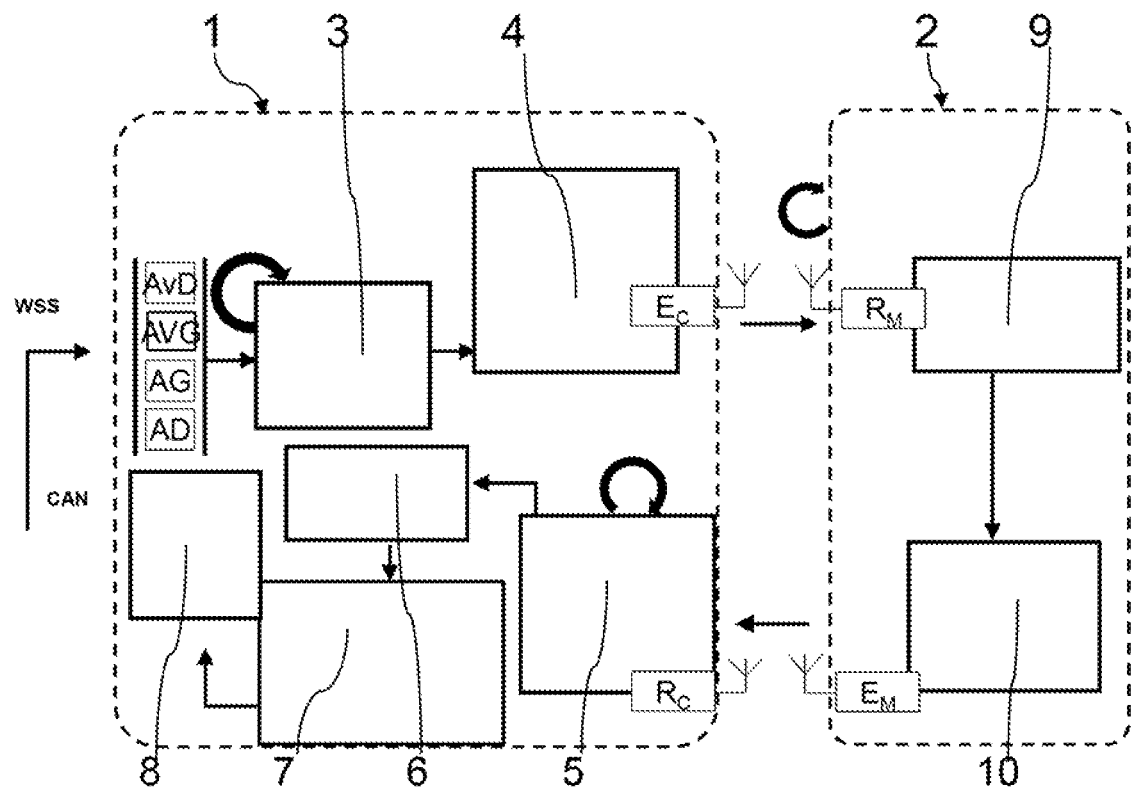
FIGS. 1 to 3 are schematic representations of the exchanges between a computer and a measurement module associated with a wheel of a motor vehicle according to a respective embodiment of a method for pairing a measurement module with a wheel of a motor vehicle according to an aspect of the present invention.
Figure 2:
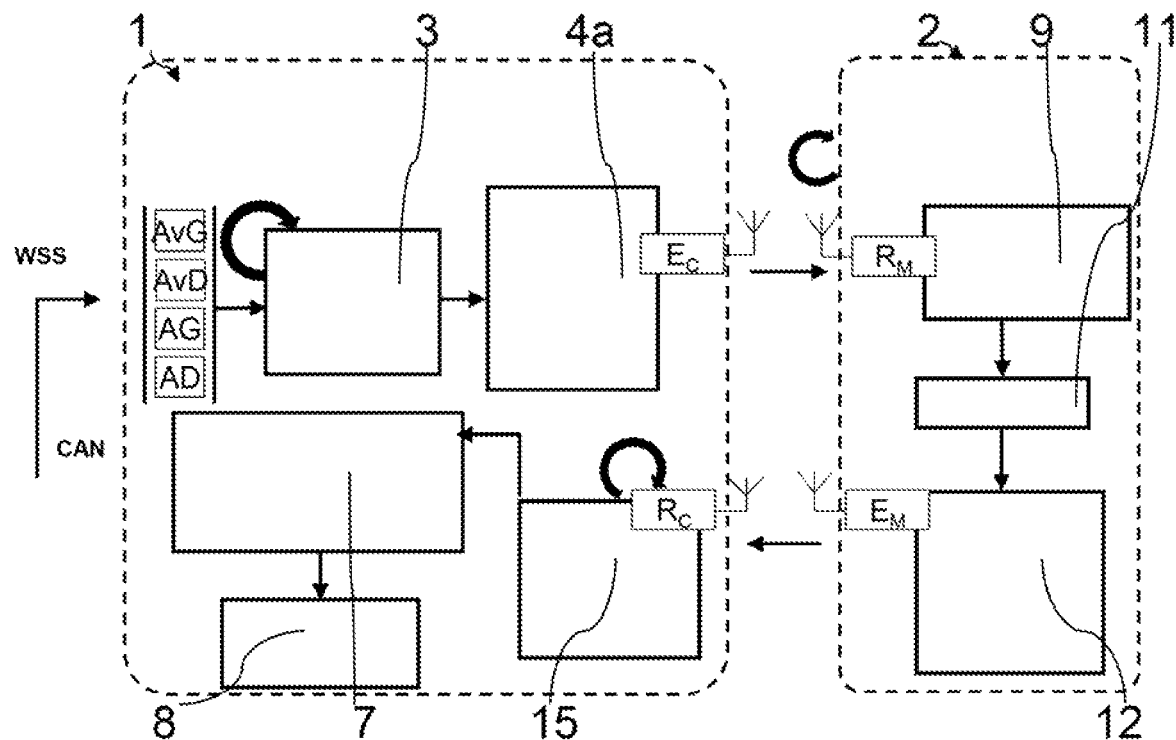
Figure 3:
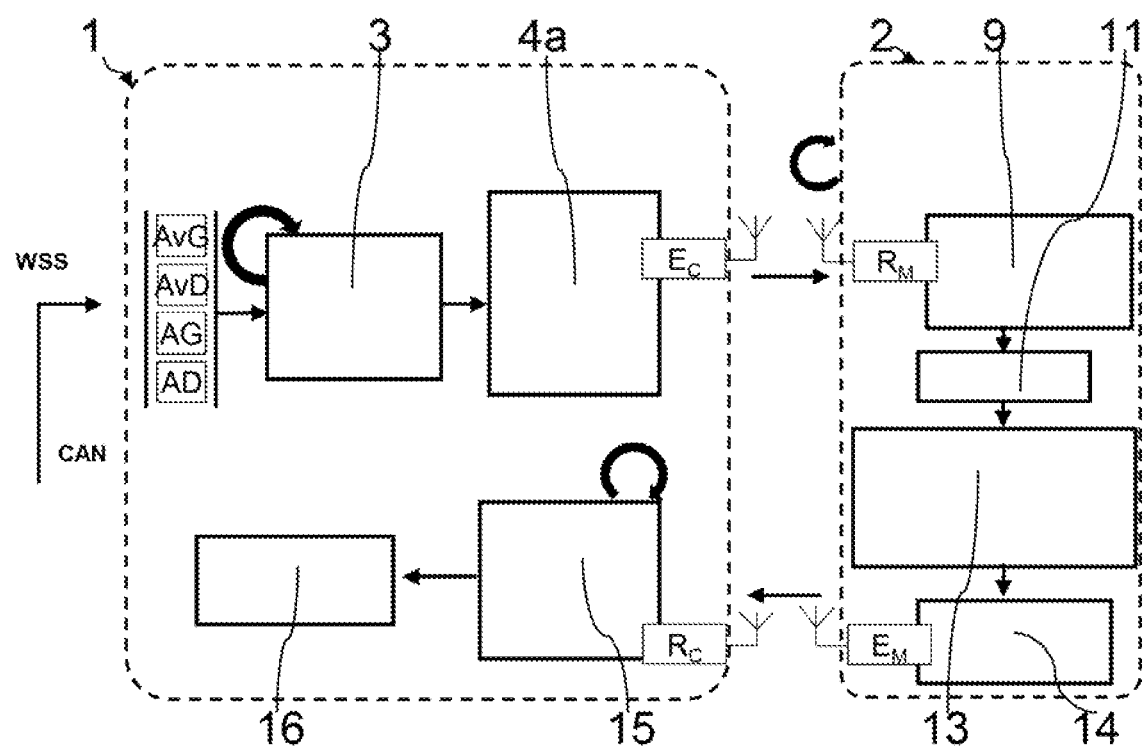

With reference to FIGS. 1 to 3, these figures show, respectively, one of three embodiments according to the invention of the method for pairing a measurement module 2 with a wheel AvG, AvD, AG, AD of a motor vehicle comprising a plurality of wheels AvG, AvD, AG, AD, the embodiments of FIGS. 2 and 3 relating, respectively, to alternative variants of a second embodiment.

The pairing method is implemented by a computer 1 on board said vehicle, advantageously in an electronic control unit centralizing the information relating to measurement modules 2 or wheel units.

Each measurement module 2 is installed in a respective wheel AvG, AvD, AG, AD of the motor vehicle, for example provided with four wheels AvG, AvD, AG, AD, but this is not limiting, for example front left, front right, rear left and rear right, the vehicle being able to be a truck with ten wheels or more when a trailer is hitched to the truck.

Each measurement module 2 is capable of transmitting or receiving, respectively, to or from the computer 1, at least one measurement signal received or transmitted by the computer 1 in the form of a frame of which at least one differentiation parameter varies according to the position of the measurement module 2 relative to the computer 1.

In FIG. 1, it is the measurement module 2 which transmits measurement signals to the computer 1, not randomly as proposed by the closest prior art but following a request for transmission of a measurement signal sent to each measurement module 2 by the computer 1 for a transmission of measurement signals by each measurement module 2 back to the computer 1.

In FIGS. 2 and 3, it is the computer 1 which transmits measurement signals to each measurement module 2.

Additionally, the computer 1 periodically receives orientation signals WSS representative of an angular orientation of each of the wheels AvG, AvD, AG, AD. These orientation signals WSS may be sent by a computer 1 of a wheel anti-lock braking system which will be described in more detail below. The computer 1 then knows which wheel AvG, AvD, AG, AD of the vehicle is associated with a given group of orientation signals WSS, and vice versa. However, before implementing the method of pairing each wheel with a measurement module 2, the computer 1 does not know which wheel a measurement module 2 is associated with.

According to an aspect of the invention, the pairing method comprises, for each angular orientation signal WSS associated with a specific wheel AvG, AvD, AG, AD received by the computer 1, a step of the computer 1 transmitting a measurement signal to each measurement module 2, as shown in FIGS. 2 and 3, or a request for transmission of a measurement signal sent to each measurement module 2, as shown in FIG. 1, for transmission of a measurement signal by each measurement module 2 back to the computer 1. Since the computer 1 and each measurement module 2 communicate both in reception and in transmission, both of these modes of sending measurement signals are possible.

The pairing method next comprises the step of measuring, by one from between the computer 1 and each measurement module 2, a value of said at least one differentiation parameter of the measurement signal transmitted to each measurement module 2 or the computer 1. In FIG. 1, it is the computer 1 which performs the measurements and in FIGS. 2 and 3, it is each measurement module 2 which performs the measurements.

In FIG. 1, it is nevertheless the computer 1 which decides, according to the transmission request sent to each measurement module 2, the time when a measurement module 2 sends a measurement signal, which differentiates this measurement of the method step from the measurement module 2 randomly sending measurement signals to the computer 1, as provided for in the prior art. The measurement signals are thus more readily usable when sent according to the prescriptions given in the transmission request sent by the computer 1 to each measurement module 2.

The pairing method then comprises repetitions, up to a predetermined number, of the transmissions of measurement signals to each measurement module 2 or the computer 1 for each angular orientation signal WSS received by the computer 1. Said values of said at least one differentiation parameter are then stored for each of the repetitions. In FIG. 1, this storage takes place in the computer 1, in FIG. 2 in the computer 1 too and in FIG. 3 in each measurement module 2.

Lastly, the method comprises a step of pairing the specific wheel AvG, AvD, AG, AD associated with a group of angular orientation signals WSS with a measurement module 2. This pairing step takes place when the stored values for this measurement module 2 and for the angular orientation signals WSS associated with the specific wheel AvG, AvD, AG, AD are substantially constant with a variation of less than 10% for a majority of said values for a total number of repetitions having reached the predetermined number. Outliers may have been removed prior to an inspection of the stored values.

This pairing step is continued for all of the wheels AvG, AvD, AG, AD and all of the measurement modules 2, each wheel AvG, AvD, AG, AD being associated with a respective measurement module 2 at the end of the method.

For all of the other groups of angular orientation signals WSS not associated with the target measurement module 2, the associated measurement signals do not have one or more differentiation parameters which remain substantially constant for all of the angular orientation signals WSS of the group, hence the possibility of recognizing one of the groups of orientation signals WSS as being associated with the target measurement module 2.

Pairing can be done, in a first case, wheel by wheel, by sending specific orientation signals WSS to a first wheel and then to another when this first wheel has been paired or, in a second case, for all of the wheels almost simultaneously by sending orientation signals WSS for different angular orientations corresponding to different wheels.

In the first case, the computer 1 transmits a measurement signal to each measurement module 2 or a request for transmission of a measurement signal sent to each measurement module 2 for each angular orientation signal WSS associated with a specific wheel until a measurement module 2 has been paired with this specific wheel.

When a measurement module 2 has been paired with the specific wheel, the computer 1 transmits a measurement signal or a transmission request for each angular orientation signal WSS associated with another wheel, therefore of a different angular orientation, to the measurement modules 2 that have not yet been paired and so on until all of the measurement modules 2 have been paired with a wheel.

In the second case, the computer 1 transmits a measurement signal to each measurement module 2 or a request for transmission of a measurement signal sent to each measurement module 2 for all of the angular orientation signals WSS associated, respectively, with each of the wheels with different angular orientations. In this second case, the chosen angular orientation is specified in each measurement signal or each transmission request, so that each module may identify the orientation signal WSS associated with one wheel from another orientation signal WSS associated with another wheel.

Each measurement module 2 is paired with a wheel associated with a group of orientation signals with one or more defined angular orientations of the same specific wheel for which the measured values of said at least one differentiation parameter remain substantially constant. As soon as a wheel is paired with a measurement module, the sending of measurement signals or transmission requests ceases for this specific angular orientation associated with the wheel. One or more differentiation parameters may exist. The one or more differentiation parameters may be selected from the following values taken individually or in combination: a signal power value, a gravity value imposed on the measurement module 2 or a value of a current passing through a coil in the measurement module 2 that is sensitive to the Earth's magnetic field.

It is also possible to select an average value grouping these values with weighting parameters. One parameter may be replaced with another among these parameters when it is not satisfactory or is ineffective, for example a signal power value that is too low or aberrant.

With reference to FIGS. 1 to 3, those features which are common to all of the embodiments will be described. These FIGS. 1 to 3 show a computer 1, advantageously integrated with an electronic control unit and a measurement module 2, advantageously a wheel unit. Only one measurement module 2 is shown, but the computer 1 corresponds in transmission and reception with all of the measurement modules 2 associated, respectively, with a wheel AvG, AvD, AG, AD of the motor vehicle.

The computer 1 and the measurement module 2 each comprise a transmission device and a reception device denoted, respectively, by $E_C$ and $R_C$ for the computer 1 and by $E_M$ and $R_M$ for the measurement module 2.

The computer 1 receives, by means of a signal receiver, orientation signals WSS representative of an angular orientation of each of the wheels AvG, AvD, AG, AD, advantageously by means of a multiplexed bus system known by the acronym "CAN".

For each wheel position, an angular orientation is detected for the position of a specific wheel AvG, AvD, AG, AD, which bears the reference 3 in the figures, an angular orientation signal being associated with a specific wheel AvG, AvD, AG, AD.

FIG. 1 shows a first embodiment of the invention.

In FIG. 1, reference 4, the transmission device $E_C$ of the computer 1 transmits, to each measurement module 2, a request for the transmission of a synchronized response measurement signal transmitted by each measurement module 2, specifying conditions for this transmission of the measurement signal by each measurement module 2, in particular by a predefined date indicated in the request, which advantageously corresponds to the reception of an angular orientation signal by the computer 1.

When the computer 1 transmits a request for transmission of a measurement signal sent to each measurement module 2 for transmission of a measurement signal by each measurement module 2 back to the computer 1, this transmission request includes a scheduled transmission order with a transmission date and/or a delay between two consecutive transmissions of measurement signals sent back by each measurement module 2.

In FIG. 1, reference 9, the reception device $R_M$ of the measurement module 2 receives the request for transmission of a synchronized message indicating the position of the wheel AvG, AvD, AG, AD under consideration with scheduled transmission conditions, in particular in terms of date of transmission. The transmission device $E_M$ of the measurement module 2 transmits, at 10, a measurement signal on the planned date and under the scheduled transmission conditions contained in the request.

As mentioned above, it is possible for the computer 1 to use a plurality of reference angular orientations and no longer just one with communication of the reference angular orientation on which the transmission order is effectively synchronized. In FIG. 1, reference 5, the computer 1 receives a measurement signal containing the one or more differentiation parameters and an identification of each measurement module 2 from which the signal has come. At reference 6, a measurement is performed of the one or more differentiation parameters contained in the measurement signal received by the computer 1 from the measurement module 2.

At reference 7, after several identical reiterations during repetitions of the processing of the received measurement signal, an identification is performed of the pair of a measurement module 2 and an angular position of a wheel AvG, AvD, AG, AD characterized by a set of values of the one or more constant differentiation parameters differing by less than 10%.

A pairing is then performed, at 8, of the measurement module 2 via its identifier with orientation signals WSS representative of an angular orientation of a specific wheel AvG, AvD, AG, AD and therefore of one wheel. This pairing is kept in the memory in the computer 1.

It follows that in this first embodiment of the invention, the computer 1, receiving the measurement signals being sent back to it by each measurement module 2, itself stores the values of the one or more differentiation parameters for each measurement module 2.

It then performs the pairing of each measurement module 2 with a given wheel AvG, AvD, AG, AD when the stored values for this measurement module 2 are substantially constant for the transmissions of the angular orientation signal WSS associated with the given wheel AvG, AvD, AG, AD, with a variation of less than 10% for a majority of the values for a total number of repetitions having reached the predetermined number, as mentioned above.

FIGS. 2 and 3 show two alternative variants for a second embodiment of the invention.

In FIGS. 2 and 3, as an alternative to FIG. 1, at reference 4a, the transmission device $E_C$ of the computer 1 transmits a measurement signal including the one or more differentiation parameters that is synchronized with the predefined angular orientation signal WSS, advantageously indicating the position of the wheel AvG, AvD, AG, AD under consideration, to each measurement module 2.

At reference 9, the reception device $R_M$ of the measurement module 2 receives the measurement signal including the one or more differentiation parameters, advantageously indicating the position of the wheel AvG, AvD, AG, AD under consideration with information indicating the reference angular orientation on the basis of which the computer 1 has synchronized its transmission. The indication of the position of the wheel AvG, AvD, AG, AD under consideration is necessary in the embodiment of FIG. 3 while it is only optional in the embodiment of FIG. 2 illustrating an embodiment for which each measurement module does not perform pairing.

In FIGS. 2 and 3, for the two variants dependent on the second embodiment, at reference 11, in each measurement module 2, a measurement is performed of the one or more differentiation parameters contained in the measurement signal transmitted by the computer 1.

In the first variant shown in FIG. 2, at 12, a report frame of the measured value of the one or more differentiation parameters of the measurement signal is transmitted to the computer 1, providing the position of the wheel AvG, AvD, AG, AD under consideration and an identifier of the measurement module 2 for recognition thereof. This is performed by the transmission device $E_M$ of the measurement module 2 and is received by the reception device $R_C$ of the computer 1. In this first variant, the measurement module 2 only performs measurements of the values of the one or more differentiation parameters and does not process these data in order to pair a measurement module 2 with a specific wheel AvG, AvD, AG, AD.

In this first variant of the second embodiment, when each measurement module 2 receives the measurement signals sent to it by the computer 1, each measurement module 2 measures the values of the one or more differentiation parameters during each transmission from the computer 1. Each measurement module 2 sends the values of the one or more differentiation parameters with an identification of the measurement module 2 to the computer 1 which will then be responsible for interpreting the values of the one or more differentiation parameters in order to find out whether these values remain substantially constant for the same group of angular orientation signals WSS associated with a specific wheel AvG, AvD, AG, AD.

The computer 1 receives, at 15, a report frame containing the value of the one or more differentiation parameters, the angular orientation signal WSS and an identification of the measurement module 2.

At reference 7, a measurement is performed of the one or more differentiation parameters contained in the report frame received by the computer 1 from the measurement module 2. At reference 7, after several identical reiterations during repetitions of the processing of the report frame received by the computer, an identification is performed of the pair of a measurement module 2 and an angular position of a wheel AvG, AvD, AG, AD characterized by a set of values of the one or more constant differentiation parameters differing by less than 10%.

In FIG. 3, in the second variant of the second embodiment of the present invention, after measurement of the one or more differentiation parameters as referenced at 11, which step is common with the first variant of the second embodiment, the values of the one or more differentiation parameters after several measurement repetitions of the measurement signals coming from the computer 1, then, at 13, after several repetitions have provided values of the one or more differentiation parameters that are substantially constant, the pair of a measurement module 2 and angular orientation signals WSS for the same wheel AvG, AvD, AG, AD is identified.

Next, the measurement module 2 is paired with the wheel AvG, AvD, AG, AD associated with the angular orientation signal WSS.

The measurement module 2 transmits, at 14, a report frame reporting the result of the pairing that the measurement module 2 has performed to the computer 1.

This is performed by the transmission device $E_M$ of the measurement module 2 and is received by the reception device $R_C$ of the computer 1.

At 15, in the computer 1, the report frame giving the information on the pairing of the measurement module 2 with angular orientation signals WSS for a specific wheel AvG, AvD, AG, AD, which has been established by each measurement module 2, is received. Lastly, at 16, the individual items of location information for the measurement modules 2 are grouped together in the computer 1.

In this second variant of the second embodiment, each measurement module 2 receives the measurement signals sent to it by the computer 1. Each measurement module 2 measures the values of the one or more differentiation parameters during each transmission from the computer 1.

Additionally, each measurement module 2 stores said values of the one or more differentiation parameters and checks whether these values remain substantially constant for angular orientation signals WSS for the same wheel AvG, AvD, AG, AD which has previously been received by the computer 1. In this case, the measurement module 2 sends the computer 1 a report frame for pairing with the wheel AvG, AvD, AG, AD, associated with said angular orientation signals WSS, the pairing report frame containing an identification of the measurement module 2.

A communication between the computer 1 and each measurement module 2 may take place in accordance with a communication standard allowing very short range bidirectional data exchange using Bluetooth®-type UHF radio waves, both in transmission and in reception.

The orientation signals WSS representative of the angular orientation of each of the wheels AvG, AvD, AG, AD may come from a plurality of wheel anti-lock braking modules, each wheel anti-lock braking module, installed facing a wheel, being capable of delivering, to the computer 1, the orientation signals WSS representative of the angular orientation of the associated wheel AvG, AvD, AG, AD.

A wheel anti-lock braking system, also referred to by the acronym ABS system, comprises a plurality of wheel anti-lock braking modules each installed facing each wheel of the vehicle. Each wheel anti-lock braking module includes a wheel speed sensor delivering a signal representative of the angular orientation of the corresponding wheel to the computer 1.

An aspect of the invention relates to a set of a computer 1 and measurement modules 2 associated, respectively, with a wheel AvG, AvD, AG, AD of a motor vehicle for the implementation of such a method. Each measurement module 2 has means for transmitting $E_M$ and of receiving $R_M$ signals received or transmitted by the computer 1. The computer 1 has, on the one hand, means for transmitting $E_C$ and of receiving $R_C$ signals received or transmitted by each measurement module 2 and, on the other hand, means for receiving orientation signals WSS representative of the angular orientation of each of the wheels AvG, AvD, AG, AD, advantageously from wheel anti-lock braking modules of an ABS system.

Each measurement module 2 comprises means for storing its respective identification using a respective identifier and means for transmitting its respective identifier for its identification to the computer 1. The computer 1 thus knows which measurement module 2 sent it a measurement signal or a report frame. The measurement module 2 thus knows which information sent by the computer 1 is specifically intended for it when the computer 1 attaches the identifier of the measurement module 2 to an information frame.

The computer 1 or each measurement module 2 comprises means for measuring a value of said at least one differentiation parameter for a measurement signal transmitted by the transmission means $E_M$ of each measurement module 2 to the computer 1, which is the case in FIG. 1, or by the transmission means $E_C$ of the computer 1 to each measurement module 2, which is the case in FIGS. 2 and 3. This is done in association with an orientation signal WSS representative of the angular orientation of each of the wheels AvG, AvD, AG, AD received by the computer 1.

The computer 1 or each measurement module 2 comprises means for storing a predetermined number of repetitions of the measurement signals and the values taken from said at least one differentiation parameter for each of the repetitions.

The computer 1 comprises means for determining a pairing of a wheel AvG, AvD, AG, AD with a specific measurement module 2 for which the measurement signals transmitted or received by this measurement module 2 for orientation signals WSS specific to a wheel AvG, AvD, AG, AD exhibit values of said at least one differentiation parameter that are substantially constant with a variation of less than 10% for a majority of said values for a total number of repetitions having reached the predetermined number.

It is possible for each measurement module 2 to be able to pair with orientation signals WSS from the same wheel, since the computer 1 can send, in a measurement signal containing the one or more differentiation parameters, a code for recognizing an orientation signal so that the orientation signals WSS having the same code and associated with the same wheel are grouped together to form a sample of differentiation parameters. However, the measurement module may not know the wheel associated with such a group of orientation signals WSS from the same source.

An aspect of the invention also relates to a motor vehicle comprising a computer 1, a plurality of wheels AvG, AvD, AG, AD, each wheel AvG, AvD, AG, AD comprising a measurement module 2. Usually, the motor vehicle is provided with a wheel anti-lock braking system with a plurality of wheel anti-lock braking modules AvG, AvD, AG, AD.

Each anti-lock braking module is installed facing a wheel AvG, AvD, AG, AD comprising means for transmitting, to the computer 1, orientation signals WSS representative of the angular orientation of said wheel.

In this motor vehicle, the computer 1 and the measurement modules 2 form a set as described above. The means for receiving orientation signals WSS representative of the angular orientation of each of the wheels AvG, AvD, AG, AD of the computer 1 receive the orientation signals WSS representative of the angular orientation of said wheel AvG, AvD, AG, AD sent by each anti-lock braking module installed facing a wheel.

The invention claimed is:

1. A method for pairing a measurement module with a wheel of a motor vehicle comprising a plurality of wheels, said method being implemented by a computer on board said vehicle, said measurement module being installed in one of the wheels of the vehicle and being capable of transmitting and receiving, respectively, to or from the computer, at least one measurement signal received or transmitted by the computer in the form of a frame of which at least one differentiation parameter varies according to the position of the measurement module relative to the computer, the computer also receiving, periodically, orientation signals representative of an angular orientation of each of the wheels, with a step of measuring, by one from between the computer and each measurement module, a value of said at least one differentiation parameter of the measurement signal transmitted to each measurement module or the computer, the pairing method comprising, for each angular orientation signal associated with a specific wheel received by the computer:

transmitting, by the computer, the measurement signal to each measurement module or of a request for transmission of the measurement signal sent to each measurement module for transmission of the measurement signal by each measurement module back to the computer;

performing repetitions, up to a predetermined number, of the transmissions of measurement signals to each measurement module or the computer for each angular orientation signal received by the computer and storage of said values of said at least one differentiation parameter for each of the repetitions;

pairing the specific wheel with a measurement module when said stored values of said at least one differentiation parameter for this measurement module and for the angular orientation signals associated with the specific wheel are substantially constant with a variation of less than 10% for a majority of said values for a total number of repetitions having reached the predetermined number;

continuing to carry out the pairing for all of the wheels and all of the measurement modules, each wheel being associated with a respective measurement module at the end of the method.

2. The method as claimed in claim 1, wherein the computer transmits a measurement signal to each measurement module or a request for transmission of a measurement signal sent to each measurement module for each angular orientation signal associated with a specific wheel for as long as a measurement module has not been paired with this specific wheel, and when a measurement module has been paired with the specific wheel, the computer transmits a measurement signal or a transmission request for each angular orientation signal associated with another wheel to the measurement modules that have not yet been paired and so on until all of the measurement modules have been paired with a wheel or the computer transmits a measurement signal to each measurement module or a request for transmission of a measurement signal sent to each measurement module for all of the angular orientation signals associated, respectively, with each of the wheels stating information on the chosen angular orientation in the transmission or the transmission request in progress, each measurement module being paired with a wheel associated with a group of orientation signals with one or more defined angular orientations of the same specific wheel for which the measured values of said at least one differentiation parameter remain substantially constant.

3. The method as claimed in claim 1, wherein said at least one differentiation parameter may be selected from the following values taken individually or in combination: a signal power value, a gravity value imposed on the measurement module or a value of a current passing through a coil in the measurement module that is sensitive to the Earth's magnetic field.

4. The method as claimed in claim 1, wherein, when the computer transmits a request for transmission of a measurement signal sent to each measurement module for transmission of a measurement signal by each measurement module back to the computer, this transmission request includes a scheduled transmission order with a transmission date and/or a delay between two consecutive transmissions of measurement signals sent back by each measurement module.

5. The method as claimed in claim 4, wherein the computer receiving the measurement signals sent back to it by each measurement module carries out itself the storage of the values of said at least one differentiation parameter for each measurement module and the pairing of each measurement module with a given wheel when the values stored for this measurement module are substantially constant for the transmissions of the angular orientation signal associated with the given wheel.

6. The method as claimed in claim 1, wherein, when each measurement module receives the measurement signals sent to it by the computer, each measurement module performs a measurement of the values of said at least one differentiation parameter during each transmission from the computer and sends the values of said at least one differentiation parameter with an identification of the measurement module to the computer.

7. The method as claimed in claim 1, wherein, when each measurement module receives the measurement signals sent to it by the computer, each measurement module performs a measurement of the values of said at least one differentiation parameter during each transmission from the computer, stores said values of said at least one differentiation parameter and checks whether these values remain substantially constant for signals synchronized with one or more defined angular orientations of the same wheel received by the computer, in which case the measurement module transmits, to the computer, a pairing report frame for the measurement module with said angular orientation signals, the pairing report frame containing an identification of the measurement module.

8. The method as claimed in claim 1, wherein a communication between the computer and each measurement module takes place in accordance with a communication standard allowing very short range bidirectional data exchange using UHF radio waves in transmission and/or in reception.

9. The method as claimed in claim 1, wherein the orientation signals representative of the angular orientation of each of the wheels come from a plurality of wheel anti-lock braking modules, each wheel anti-lock braking module, installed facing a wheel, being capable of delivering, to the computer, the orientation signals representative of the angular orientation of the associated wheel.

10. A set of a computer and measurement modules associated, respectively, with a wheel of a motor vehicle for the implementation of a method as claimed in any one of the preceding claims, each measurement module having means for transmitting and receiving measurement signals received or transmitted by the computer, the computer having, on the one hand, means for transmitting and receiving signals received or transmitted by each measurement module and, on the other hand, means for receiving orientation signals representative of the angular orientation of each of the wheels, each measurement module comprising means for storing a respective identifier and means for transmitting its respective identifier to the computer, wherein the computer or each measurement module comprises means for measuring a value of said at least one differentiation parameter of a measurement signal transmitted by the transmission means of each measurement module to the computer or by the transmission means of the computer to each measurement module in association with an orientation signal representative of the angular orientation of each of the wheels, means for storing a predetermined number of repetitions of the measurement signals and the values of said at least one differentiation parameter for each of the repetitions, the computer or each measurement module comprising means for determining a pairing of a wheel with a specific measurement module for which the measurement signals transmitted or received by this measurement module for orientation signals specific to a wheel have values of said at least one differentiation parameter that are substantially constant with a variation of less than 10% for a majority of said values for a total number of repetitions having reached the predetermined number.

11. A motor vehicle comprising a computer, a plurality of wheels, each wheel comprising a measurement module, and a plurality of wheel anti-lock braking modules with each anti-lock braking module installed facing a wheel comprising means for transmitting, to the computer, orientation signals representative of the angular orientation of said wheel, wherein the computer and the measurement modules form a set as claimed in claim 10, the means for receiving orientation signals representative of the angular orientation of each of the wheels of the computer receiving the orientation signals representative of the angular orientation of said wheel sent by each anti-lock braking module installed facing a wheel.

12. The method as claimed in claim 2, wherein said at least one differentiation parameter may be selected from the following values taken individually or in combination: a signal power value, a gravity value imposed on the measurement module or a value of a current passing through a coil in the measurement module that is sensitive to the Earth's magnetic field.

* * * * *